United States Patent [19]

Birch

[11] Patent Number: 5,732,735
[45] Date of Patent: Mar. 31, 1998

[54] PRESSURE REDUCTION VALVE

[75] Inventor: David William Birch, Bordon, England

[73] Assignee: The BOC Group plc, Windlesham, England

[21] Appl. No.: 745,235

[22] Filed: Nov. 8, 1996

[30] Foreign Application Priority Data

Nov. 16, 1995 [GB] United Kingdom ............... 9523385
Jul. 23, 1996 [GB] United Kingdom ............... 9615456

[51] Int. Cl.[6] .......................... G05D 7/01; G05D 16/10
[52] U.S. Cl. ..................... 137/505.11; 137/505.28; 137/614.18; 141/21
[58] Field of Search .............. 137/505.11, 505.28, 137/614.18; 141/21

[56] References Cited

U.S. PATENT DOCUMENTS

| | | |
|---|---|---|
| 5,033,499 | 7/1991 | Patel et al. ............... 137/505.13 X |
| 5,307,834 | 5/1994 | Tatarek-Gintowt et al. ...... 137/505.11 |

FOREIGN PATENT DOCUMENTS

| | | |
|---|---|---|
| 0 395 283 | 10/1990 | European Pat. Off. . |
| 2 202 612 | 9/1988 | United Kingdom . |
| 2 231 137 | 11/1990 | United Kingdom . |
| 2 236 171 | 3/1991 | United Kingdom . |
| 2 236 839 | 4/1991 | United Kingdom . |
| 2 269 441 | 2/1994 | United Kingdom . |

*Primary Examiner*—Gerald A. Michalsky
*Attorney, Agent, or Firm*—David A. Draegert; Salvatore P. Pace

[57] ABSTRACT

A pressure reduction valve 2 includes a piston 12, a pressure regulating sub-chamber 50 and a movable means, preferably in the form of a second piston 12', which is activated by a filling nozzle 70 to prevent the flow of fluid between an inlet 8 and the regulating sub-chamber 50 thereby to allow the flow of fluid through the valve between an outlet 10 and an inlet 8. This allows a cylinder to be filled whilst the pressure reduction valve 2 is in situ.

11 Claims, 5 Drawing Sheets

FIG. 1. DECANTING

FIG. 2. CLOSED

FIG. 3. FILLING

PRESSURE REDUCTION VALVE

The present invention relates to pressure reduction valves.

BACKGROUND OF THE INVENTION

Pressure reduction valves have utility when it is desired to reduce a fluid e.g. a compressed gas from one level of pressure to a lower level of pressure. A typical example is when gas is stored in a cylinder or other pressure vessel at a pressure of approximately 300 bar but the end user wishes to deliver the gas at a work site at a pressure below 200 bar.

Pressure reduction valves capable of reducing pressure from 300 bar to 200 bar are known.

In UK Patent Publication Number 2269441, there is described a pressure reduction valve comprising a body which defines an internal chamber in which is located valve means in the form of first and second pistons. A gas inlet from a high pressure gas cylinder is formed in the body as is an outlet. The flow of gas between the inlet and the outlet is controlled by a valve seat formed at the lower end of the first piston. The first piston is formed with an axial gas conduit which terminates in a control chamber defined by the upper surface of the first piston and an opposite surface of the body. The gas conduit communicates with a cross hole formed in the first piston, which, in turn, communicates with a second chamber located immediately adjacent the inlet. A spring biases the first piston via the second piston upwardly such that in normal operation, gas from the inlet passes over the valve seat into the second chamber, through the cross hole, some of which will exit via the outlet. The remaining gas will pass along the gas conduit into the control chamber such that pressure is created in the control chamber which acts on the first piston to counter-balance the force exerted on the first piston by the spring and the gas pressure in the second chamber which acts upon the relatively small areas of the valve seat and the first piston.

A disadvantage of this known pressure reduction valve is that the gas cylinder to which the pressure reduction valve is attached cannot be filled whilst the pressure reduction valve is in place. To fill the gas cylinder it would be necessary for the pressure reduction valve to be bypassed or removed. Such a valve would be seriously damaged if an attempt was made to pass high pressure gas through it in a filling direction.

SUMMARY OF THE INVENTION

It is an aim of the present invention to provide a pressure reduction valve, particularly for use with high pressure gas cylinders through which the gas cylinder can be filled.

According to the present invention, a pressure reduction valve comprises a body defining an internal chamber, inlet means for admitting a fluid into the chamber, a flow path extending from the inlet means to an outlet means for discharge of the fluid, valve means slidably received in the chamber for controlling the flow of fluid along the flow path, the valve means including a piston having a proximal end of small diameter and a distal end of larger diameter, the face of the proximal end being formed with a valve seating which in a first position of the piston will restrict the flow of fluid along the flow path, means for biasing the piston from said first position towards a second position in which the flow path is open, a face of the distal end of the piston defining with a co-operating surface of the body a regulating sub-chamber means allowing communication between the inlet means and the regulating sub-chamber the arrangement being such that fluid entering the inlet means together with the biasing means will move the piston from its first towards its second position to allow some fluid to flow along the flow path towards the outlet means, the remaining fluid flowing from the inlet means through means towards the sub-chamber where it exerts a force on the distal end of the piston to bias the piston back towards its first position, and movable means for selectively preventing the flow of fluid along said means between the inlet means and the regulating sub-chamber.

Preferably, the movable means is in the form of a second piston telescopically received within the piston and formed at its distal end with a sealing means, for example a chamfered face for co-operating with a seating in the surface of the body to prevent the flow of fluid between the inlet means and the regulating sub-chamber.

The biasing means may be a compression spring known per se. Alternatively, a passage in the body may be provided to allow fluid under pressure to augment or replace the spring pressure biasing the piston towards its second position.

In a preferred embodiment the valve seating is annular in configuration which allows the pressure reduction valve to be made relatively compact.

BRIEF DESCRIPTION OF THE DRAWING

Embodiments of the invention will now be described by way of example, reference being made to the Figures of the accompanying diagrammatic drawings in which.

DETAILED DESCRIPTION OF THE INVENTION

Figure 1:
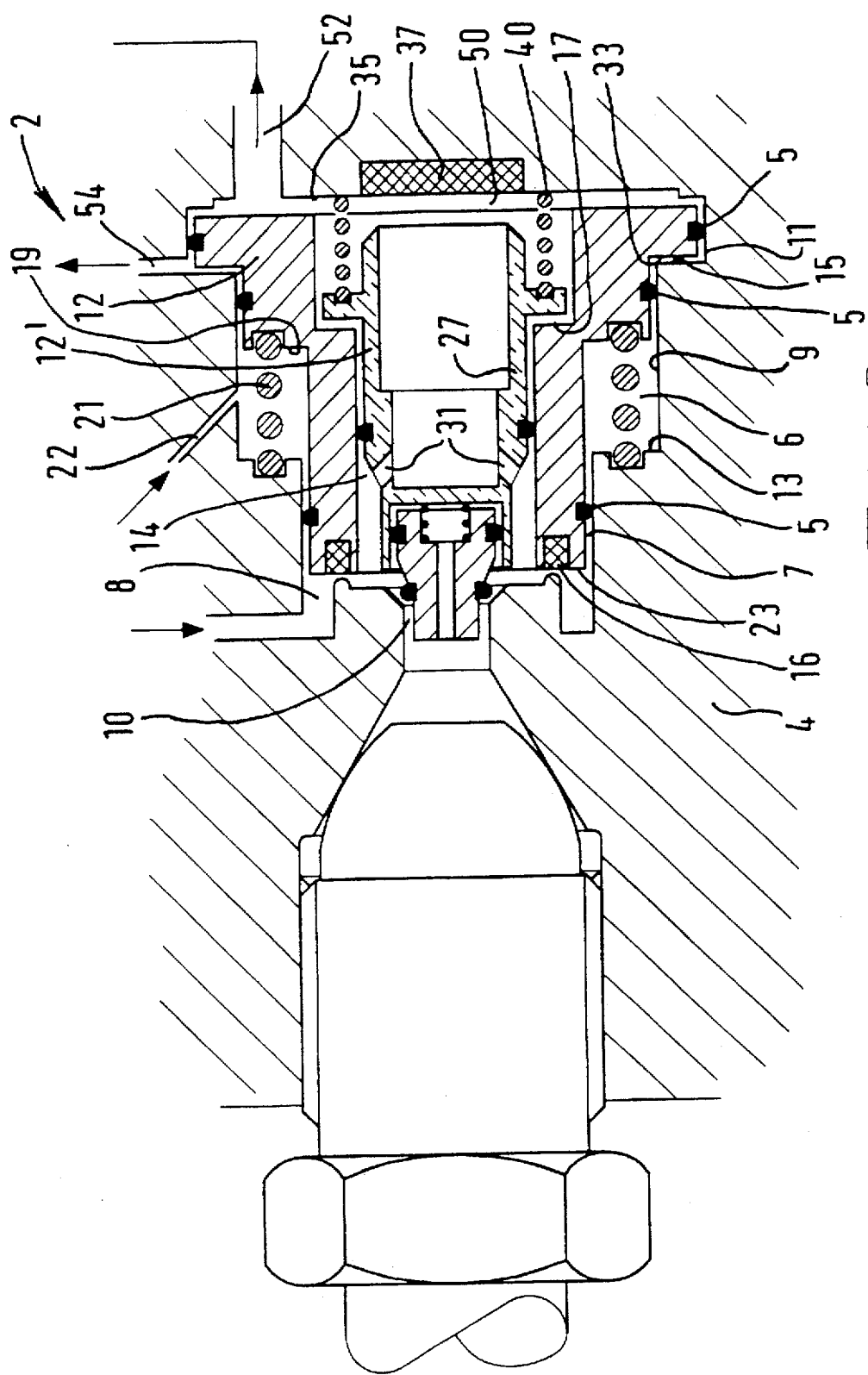
FIG. 1 is a schematic cross-section through a first embodiment of a pressure reduction valve according to the present invention illustrating the relative positions of parts of the valve when said valve is in an open or decanting position.
Figure 2:
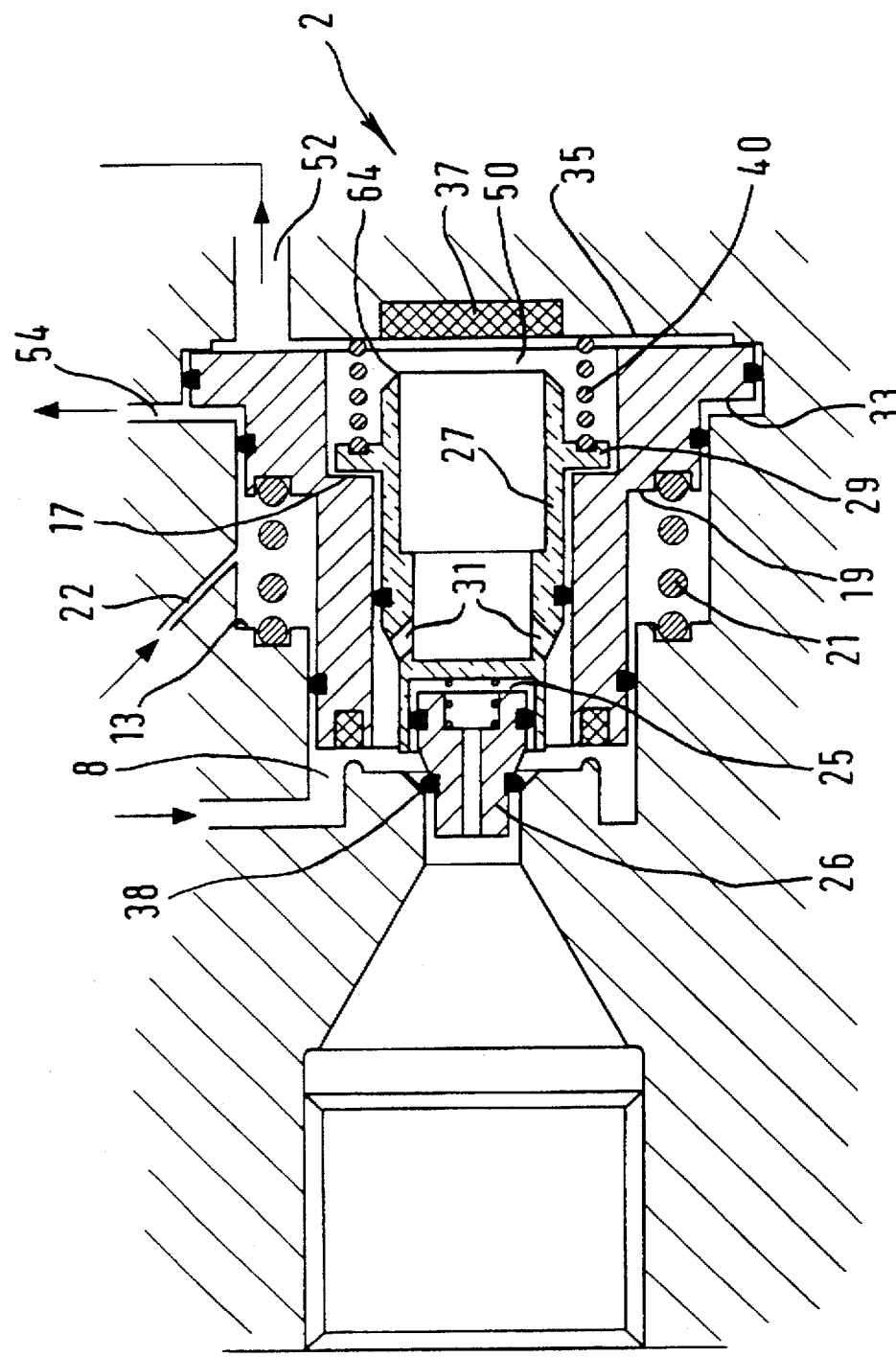
FIG. 2 is a schematic cross-section similar to FIG. 1 but illustrating the relative positions of parts of the valve when said valve is in a closed position.
Figure 3:
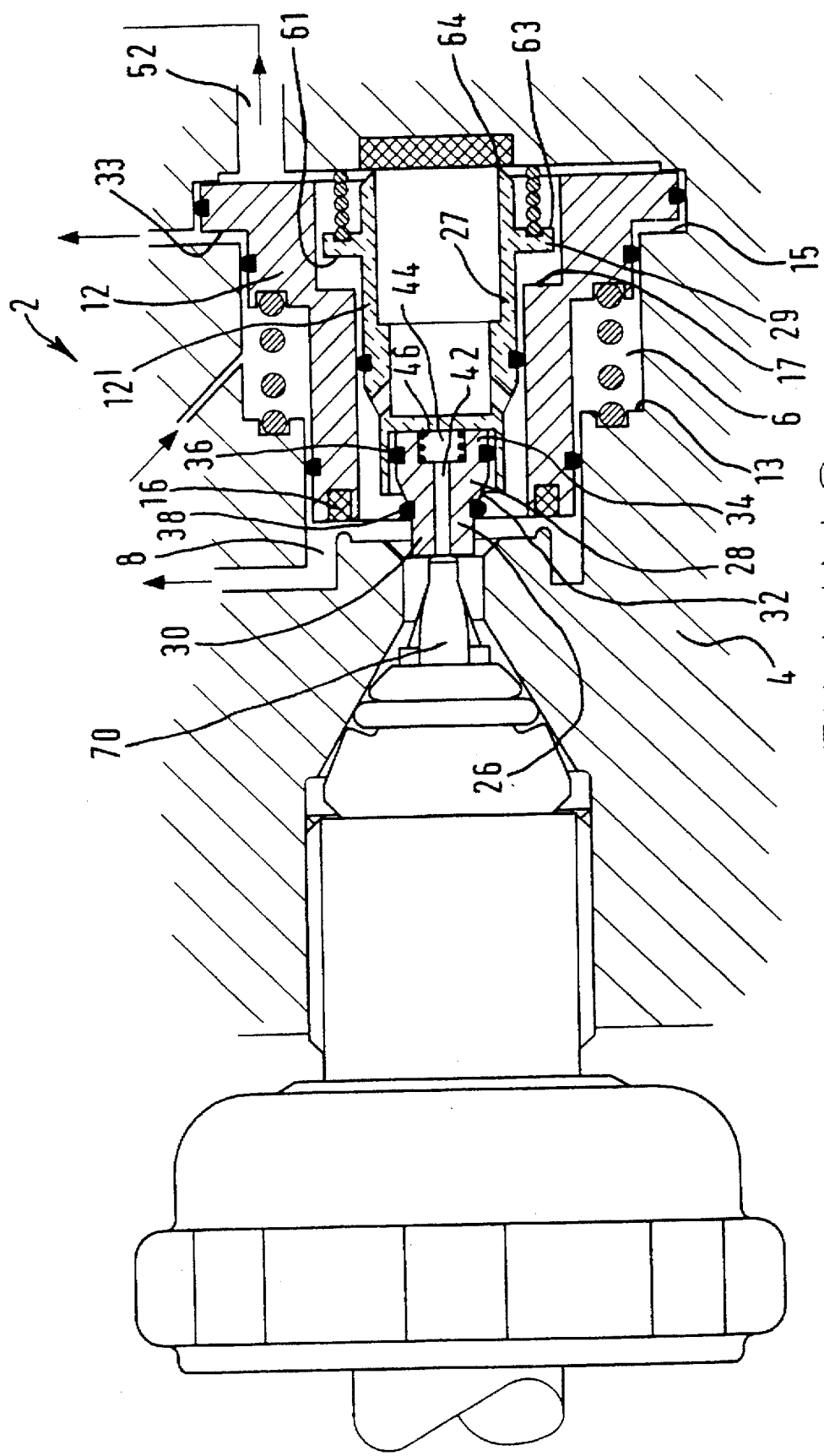
FIG. 3 is a schematic cross-section similar to FIGS. 1 and 2 but illustrating the relative positions of parts of the valve when the gas cylinder to which the valve is attached is being filled from an outside source.

As shown in FIGS. 1, 2 and 3 a pressure reduction valve 2 for use, for example, with a high pressure gas cylinder comprises a body 4 which defines an internal chamber 6. The chamber 6 has a first forward section 7 of relatively small diameter, an intermediate section 9 and a rear section 11 of relatively large diameter. The sections 7 and 9 define between them a rearwardly facing shoulder 13 and the sections 9 and 11 define between them a rearwardly facing shoulder 15.

Formed in the body 4 is an annular gas inlet 8 communicating with the chamber 6 and spaced therefrom a central outlet 10.

Located within the chamber 6 is valve means which includes a first piston 12 slidably received within the chamber 6. The piston 12 has a proximal end of relatively small diameter which is a slide fit within section 7 of chamber 6; an intermediate portion which is accommodated in section 9; and a distal end of relatively large diameter which is accommodated within the section 11 of chamber 6. The outer surfaces of the proximal, intermediate and distal portions of piston 12 are each formed with a groove in which is located an O-ring seal 5 which engages the co-operating surface of respective sections 7, 9 and 11 in a gas tight manner. The proximal and intermediate portions of the piston 12 define between them a forward facing shoulder 19 and the intermediate and distal portions define between them a forward facing shoulder 33. Located between the shoulders 13 and 19 is biasing means in the form of a compression spring 21.

A passage 22 extends through the body 4 between the intermediate section 9 of the chamber 6 and the closure valve (not shown) of the gas cylinder to which the pressure reduction valve 2 is attached.

The forward face 23 of the proximal end of the first piston 12 is formed with an annular valve seating 16 in alignment with the annular inlet 8.

As shown, the piston 12 has a through bore 14 with a first forward part of smaller diameter than a second rearward part. The parts define between them a rearwardly facing shoulder 17. A second piston 12' is located within the through bore 14 of the piston 12. The proximal end of piston 12' is formed with a blind bore 25 in which is received a minimum pressure retaining non-return valve 26. The valve 26 includes a body part 28 comprising a forward nose portion 30 of small diameter, an intermediate conical portion 32 and a rear portion 34 of relatively large diameter. The rear portion 34 is dimensioned to be a slide fit within the blind bore 25 and includes a groove holding an O-ring seal 36 which engages in a gas tight manner with the inside surface of the blind bore 25. A further O-ring seal 38 is located in a groove formed at the junction of the conical portion 32 and the nose portion 30. A passage 42 extends from the forward face of the nose portion 30 towards a bore 44 in which is located a compression spring 46.

Extending rearwardly from the proximal end of the piston 12' is a hollow body portion 27 which is a sliding fit within the first forward part of the bore 14. A flange 29 extends outwardly from the hollow body portion 27 and defines a forwardly facing shoulder 61 and a rearwardly facing shoulder 63. The piston 12' terminates at its distal end in a sealing means in the form of a chamfered face 64. Through holes 31 permit communication from the bore 14 into the hollow interior of the body portion 27 as will be explained. The holes 31 together with the hollow interior of the body portion 27 form part of a passage which extends from the distal chamfered face 64 of the piston 12' towards the inlet 8.

Formed in the surface 35 of the wall of the body 4, opposite the distal chamfered face 64 of the piston 12' is a seating 37. The surface 35 of the wall defines with the distal ends of the pistons 12, 12' a regulating sub-chamber 50.

A spring 40 is located between the rearwardly facing surface 63 of the flange 29 and the opposite surface 35 of the wall to bias the flange 29 forwardly against the rearwardly facing shoulder 17 formed in the passage 14 of the piston 12.

A passage 52 extends from the sub-chamber 50 and communicates with a safety relief valve (not shown). Likewise, a further passage 54 is formed in the body 4 and extends from the chamber 6 to atmosphere and acts as a vent.

The piston 12 will normally adopt the position within the chamber 6 as shown in FIG. 2 since the spring 21 acting on the shoulder 19 will bias the piston rearwardly (to the right as shown) towards the surface 35 of the body 4. Similarly, the piston 12' will adopt the position illustrated in FIG. 2 since the spring 40 will force the shoulder 61 of flange 29 against shoulder 17 in the bore 14. Further, the o-ring seal 38 on the non-return valve 26 will engage on a surface of the outlet 10.

In use, when the gas cylinder tap is turned on, the gas at high pressure for example, 300 bar will enter the chamber 6 via the annular inlet 8. Some of the gas will pass from the inlet 8 along a flow path over the valve seating 16, between the conical portion 32 of the valve 26 and the opposite surface of the body 4 and discharge through the outlet 10. As the gas flows over the conical portion 32, the valve 26 will be biased to the right against the action of the spring 44. The remaining gas will pass over the valve seating 16, through the holes 31 in the piston 12' along the hollow body portion 27 to occupy the regulating sub-chamber 50 where it will exert a force on the distal end of the piston 12 to move the piston to the left against the action of spring 21 and any pressure being applied by the gas flowing through the passage 22. Any gas or air trapped between the shoulders 15 and 33 will be vented to atmosphere via the passage 54.

Clearly, a balanced position of the piston 12 will be reached such that the pressure of gas flowing from the outlet will be less than 200 bar.

Should the circumstance arise when the gas cylinder needs to be recharged then the end 70 of a high pressure hose enters the outlet 10 as shown in FIG. 3. The end 70 will physically push the valve 26 rearwardly (to the right) as shown to allow high pressure gas to flow through the outlet 10 between the surface of the conical portion 32 and the opposite surface of the body 4 over the valve sealing 16 and through the inlet 8 and into the body of the gas cylinder.

Movement of the valve 26 rearwardly will cause the piston 12' also to move rearwardly (to the right) as shown against the bias of the spring 40 until the chamfered face 64 engages in a gas tight manner the seating 37. This will effectively stop high pressure gas from entering the sub-chamber 50 and causing the piston 12 to move forwardly to the left to interrupt the flow of gas from the high pressure hose into the gas cylinder.

Said movement will also prevent any gas pressure from reaching the safety relief valve which is set at a lower operating pressure than the pressure needed to fill the gas cylinder.

Figure 4:
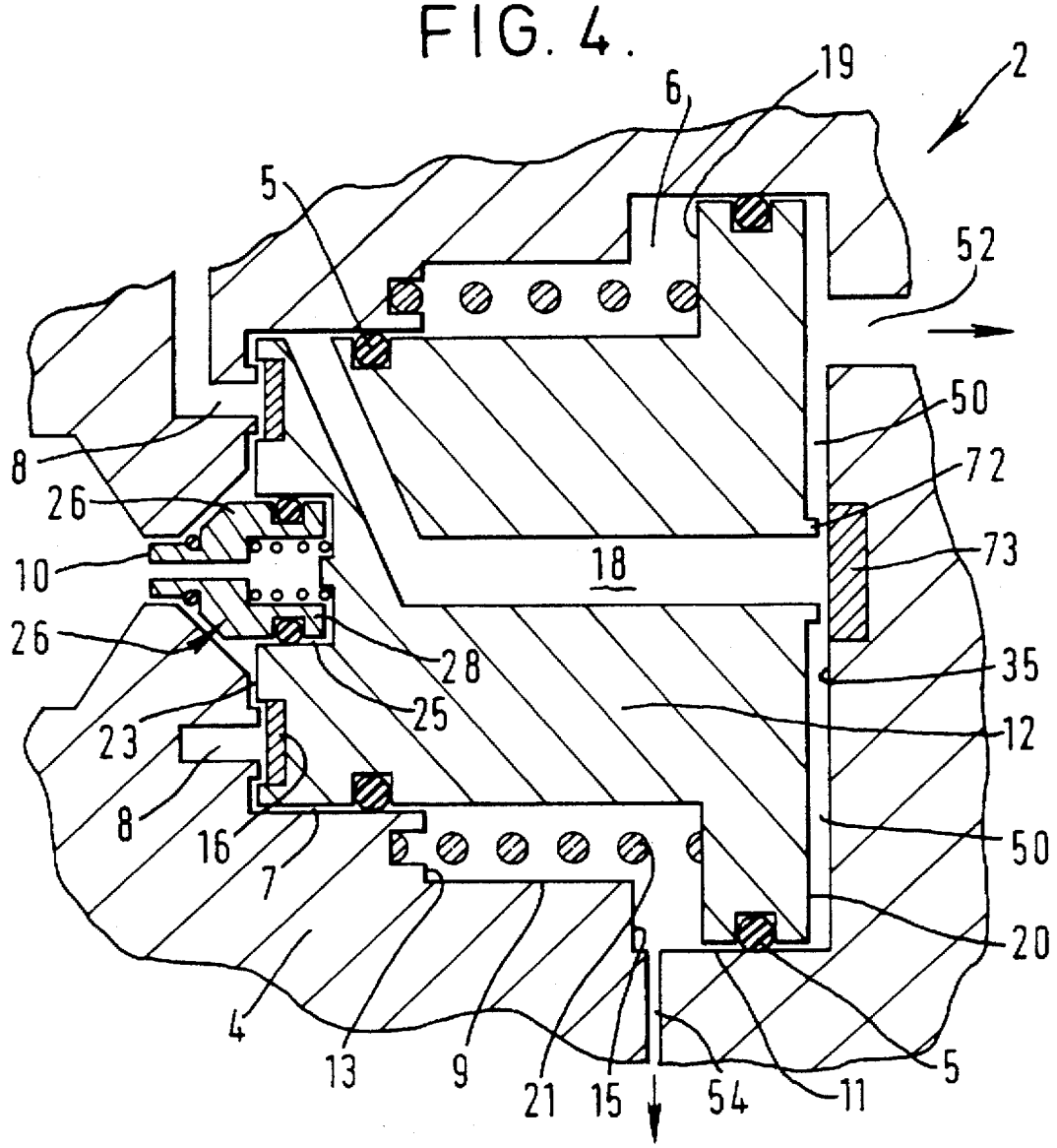
FIG. 4 is a schematic cross-section through a second embodiment of a pressure reduction valve according to the present invention illustrating the relative positions of parts of the valve when said valve is in an open or decanting position.
Figure 5:
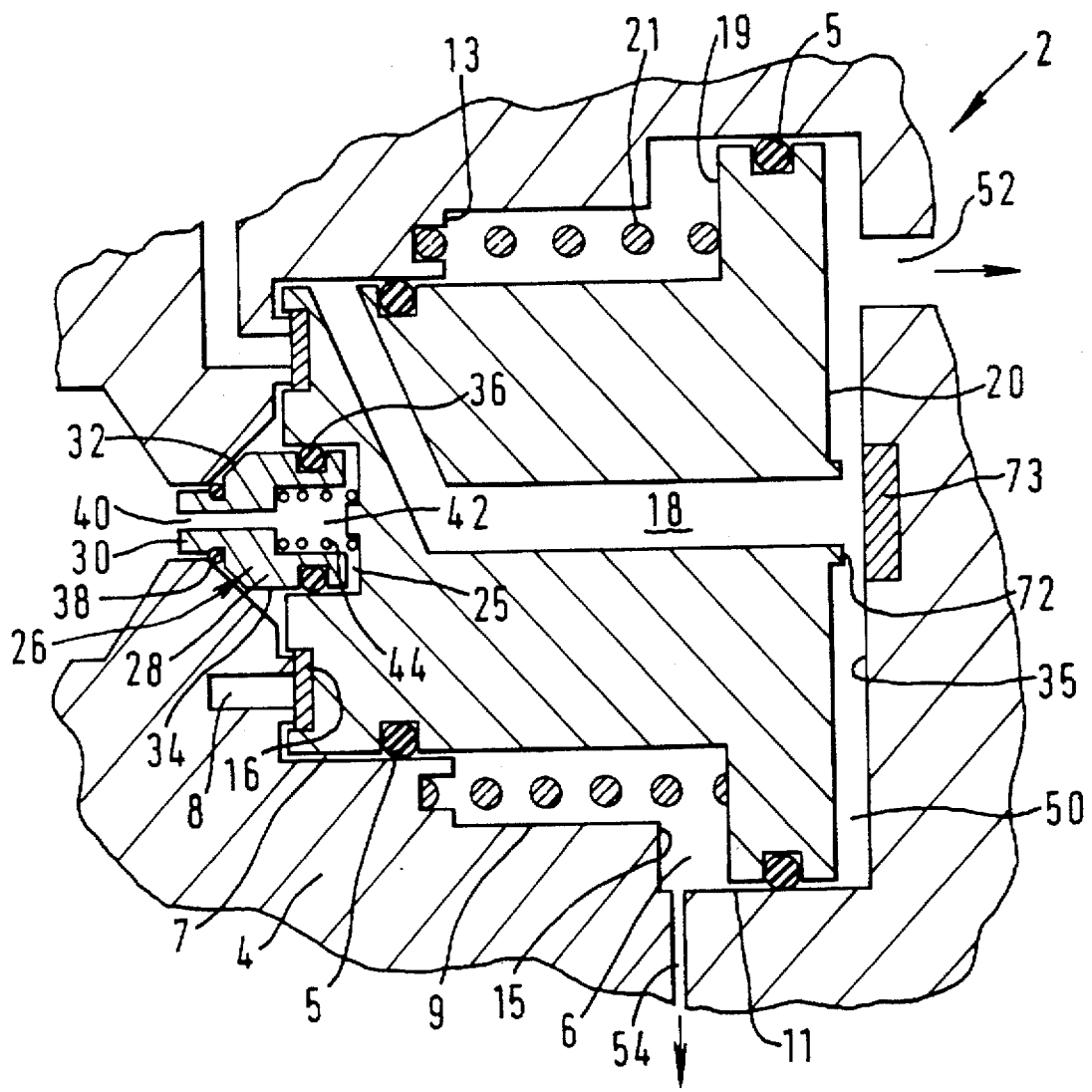
FIG. 5 is a schematic cross-section similar to FIG. 4 but illustrating the relative positions of parts of the valve when said valve is in a closed position.

Referring now to FIGS. 4 & 5 where like reference numerals denote like parts, a pressure reduction valve 2 for use, for example, with a high pressure gas cylinder comprises a body 4 which defines an internal chamber 6. The chamber 6 has a first forward section 7 of relatively small diameter, an intermediate section 9 and a rear section 11 of relatively large diameter. The sections 7 and 9 define between them a rearwardly facing shoulder 13 and the sections 9 and 11 define between them a rearwardly facing shoulder 15.

Formed in the body 4 is an annular gas inlet 8 communicating with the chamber 6 and spaced therefrom a central outlet 10.

Located within the chamber 6 is valve means which includes a piston 12 slidably received within the chamber 6. The piston 12 has a proximal end of relatively small diameter which is a slide fit within section 7 of chamber 6; and a distal end of relatively large diameter which is a slide fit within the rear section 11 of the chamber 6. The surfaces of the proximal and distal ends of piston 12 are each formed with a groove in which is located an O-ring seal 5 which engages the co-operating surface of respective sections 7 and 11, in a gas tight manner. The proximal and distal ends of the piston 12 define between them a forward facing shoulder 19. Located between the shoulders 13 and 19 is biasing means in the form of a compression spring 21.

The forward face 23 of the proximal end of piston 12 is formed with an annular valve seating 16 in alignment with the annular inlet 8. Also formed in the face 14 is a central blind bore 25 in which is received a minimum pressure retaining non-return valve 26. The valve 26 includes a body part 28 comprising a forward nose portion 30 of small diameter, an intermediate conical portion 32 and a rear portion 34 of relatively large diameter. The rear portion 34 is dimensioned to be a slide fit within the bore 25 and includes a groove holding an O-ring seal 36 which engages in a gas tight manner with the surface of the bore 25. A further O-ring seal 38 is located in a groove formed at the junction of the conical portion 32 and the nose portion 30. A passage 40 extends from the forward face of the nose portion 30 towards a bore 42 in which is located a compression spring 44.

A passage 18 extends through the piston 12 from the rearward face 20 of the distal end of piston 12 towards a location in the surface of the proximal end adjacent face 23. The termination of passage 18 at the face 20 is surrounded by an annular protuberance 72. Formed in the surface 35 of the wall of the body 4, opposite the protuberance 72 is a seating 73. The surface 35 and the face 20 defined between them a regulating sub-chamber 50. A passage 52 extends from the sub-chamber 50 and communicates with a safety relief valve (not shown).

A further passage 54 is formed in the body 4 and extends from the chamber 6 to atmosphere and acts as a vent.

The piston 12 will normally adopt the position within the chamber 6 as shown in FIG. 4 since the spring 21 acting on the shoulder 19 will bias the piston 12 rearwardly towards the surface 35 of the body 4. At the same time, although the valve 26 will be biased towards the outlet 10 by means of a spring 44, there will be sufficient space between the conical portion 32 and the opposite surface of the body 4 to permit the passage therethrough of a gas.

In use, when the gas cylinder tap is turned on the gas at high pressure for example, 300 bar will enter the chamber 6 via the annular inlet 8. Some of the gas will pass from the inlet 8 along a flow path over the valve seating 16, face 23 and between the conical portion 32 of the valve 26 and the opposite surface of the body 4 and discharge through the outlet 10. As the gas flows over the conical portion 32, the valve 26 will be biased to the right (as illustrated in FIG. 1) against the action of the spring 44. The remaining gas will pass over the valve seating 16 and along the side of the proximal end of piston 12 to enter and flow along the passage 18. The gas will leave the passage 18 and occupy the regulating sub-chamber 50 where it will exert a force on the total area of face 20 and cause the piston 12 to move to the left as shown in FIG. 5 against the action of spring 21 and the pressure being applied by the gas to the relatively small face 23 of the proximal end of the piston 12. Any gas or air trapped between the shoulders 13 and 19 will be vented to atmosphere via the passage 54.

Clearly, a balanced position of the piston 12 will be reached such that the pressure of gas flowing from the outlet 10 will be less than 200 bar.

Should the circumstance arrive when the gas cylinder needs to be recharged then the end of a high pressure hose especially adapted to enter the outlet 10 will cause the valve 26 and hence the piston 12 to move to the right such that the protuberance 72 engages in a substantially gas type manner the seating 73. The high pressure gas will then flow through the outlet 10 between the surface of the conical portion 32 and the opposite surface of the body 4, over the surface 23 through the inlet 8 and into the body of the gas cylinder. Gas will be effectively stopped from entering the sub-chamber 50 by virtue of the engagement of the protuberance 72 with the seating 73.

It will be evident that the pressure reduction valve described with reference to the above embodiment has relatively few moving parts and is as a consequence relatively inexpensive to manufacture.

It will be appreciated that minimum pressure retaining non-return valves are known for maintaining a minimum pressure in the gas cylinder and preventing the accidental or inadvertent flow of a gas back into the gas cylinder from a work site.

I claim:

1. A pressure reduction valve comprises a body (4) defining; an internal chamber (6), inlet means (8) for admitting a fluid into the chamber (6), a flow path extending from the inlet means (8) to an outlet means (10) for discharge of the fluid, valve means slidably received in the chamber (6) for controlling the flow of fluid along the flow path, the valve means including a piston (12) having a proximal end of small diameter and a distal end of larger diameter, the face of the proximal end being formed with a valve seating (16) which in a first position of the piston (12) will restrict the flow of fluid along the flow path, means for biasing the piston (12) from said first position towards a second position in which the flow path is open, a face of the distal end of the piston (12) defining with a co-operating surface (35) of the body (4) a regulating sub-chamber (50), communicating means (27, 31; 18) allowing communication between the inlet means (8) and the regulating sub-chamber (50) the arrangement being such that fluid entering the inlet means (8) together with the means for biasing the piston (12) will move the piston from its first towards its second position to allow some fluid to flow along the flow path towards the outlet means (10), the remaining fluid flowing from the inlet means (8) through communicating means (27, 31; 18) towards the sub-chamber (50) where it exerts a force on the distal end of the piston (12) to bias the piston (12) back towards its first position, and movable means adapted to be activated by a filling nozzle to prevent the flow of fluid along said communicating means (27, 31; 18) between the inlet means (8) and the regulating sub-chamber (50) and to permit flow of fluid through the valve between the outlet means (10) and the inlet means (8).

2. A pressure reduction valve as claimed in claim 1 wherein the piston (12) is a first piston, and in which the movable means is in the form of a second piston (12') telescopically received within the piston (12) and formed at its distal end with a sealing means (64) for co-operating with a seating (37) in the surface (35) of the body (4) to prevent the flow of fluid between the inlet means (8) and the regulating sub-chamber (50).

3. A pressure reduction valve as claimed in claim 2, in which the means for biasing the piston (12) comprises a compression spring (21).

4. A pressure reduction valve as claimed in claim 3, in which the means for biasing the piston (12) includes a passage (22) in the body (2) extending from a source of fluid under pressure to a location in the chamber (6) between a shoulder (13) formed in the chamber (6) and a shoulder (19) formed on the piston (12).

5. A pressure reduction valve as claimed in claim 2, in which the valve seating (16) is annular in configuration.

6. A pressure reduction valve as claimed in claim 5, in which the inlet means (8) is annular in configuration and the outlet means (10) is located centrally of the annulus formed by the inlet means (8).

7. A pressure reduction valve as claimed in claim 1, in which the means for biasing the piston (12) comprises a compression spring (21).

8. A pressure reduction valve as claimed in claim 7, in which the means for biasing the piston (12) includes a passage (22) in the body (4) extending from a source of fluid under pressure to a location in the chamber (6) between a shoulder (13) formed in the chamber (6) and a shoulder (19) formed on the piston (12).

9. A pressure reduction valve as claimed in claim 1, in which the valve seating (16) is annular in configuration.

10. A pressure reduction valve as claimed in claim 9, in which the inlet means (8) is annular in configuration and the outlet means (10) is located centrally of the annulus formed by the inlet means (8).

11. A pressure reduction valve as claimed in claim 1, in which the movable means includes a protuberance (72) formed at the face (20) of the distal end of the piston (12) which engages in a fluid tight manner with a seating (73) in the surface (35) of the body (4) to prevent the flow of fluid between the inlet means (8) and the regulating sub-chamber (50).

* * * * *